Jan. 30, 1934.  J. W. SMITH  1,945,237
SPRING CONNECTION
Filed Dec. 4, 1930
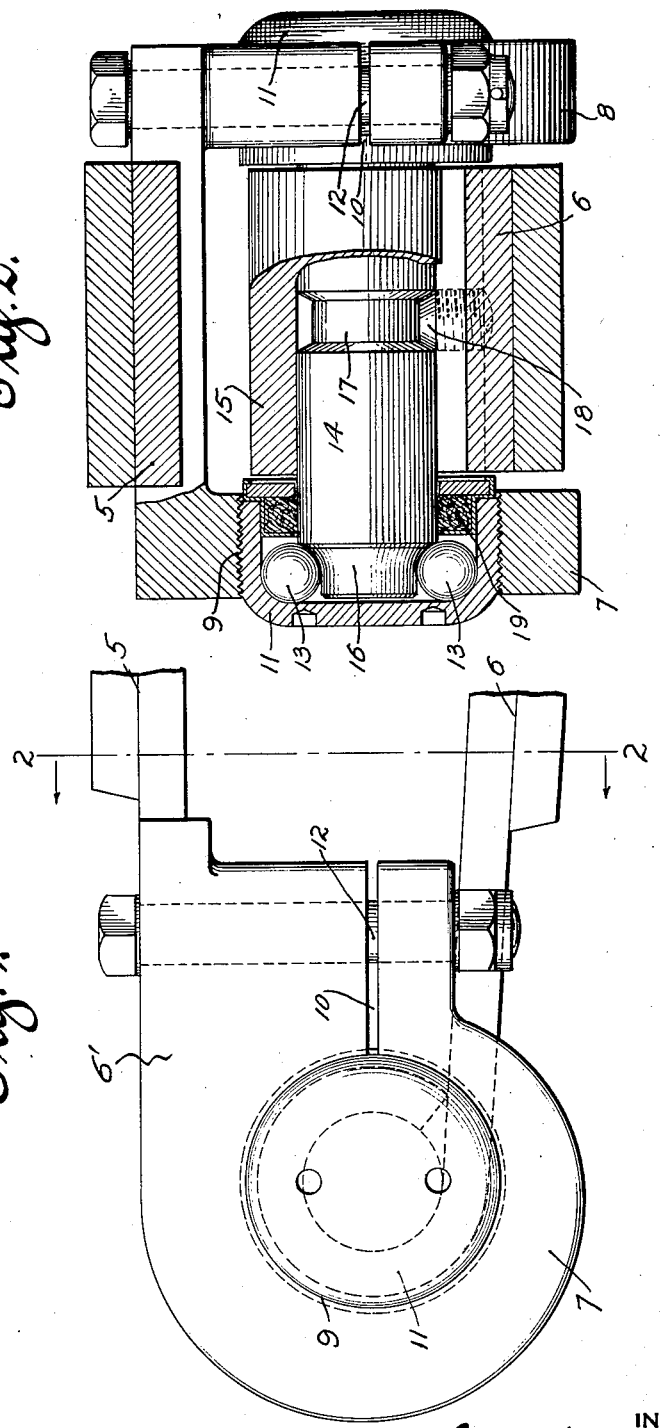
INVENTOR
John W. Smith
BY
ATTORNEYS Patented Jan. 30, 1934

1,945,237

UNITED STATES PATENT OFFICE 1,945,237

SPRING CONNECTION

John W. Smith, New Britain, Conn., assignor to The Fafnir Bearing Company, New Britain, Conn., a corporation of Connecticut Application December 4, 1930. Serial No. 499,923

2 Claims. (Cl. 267—55)

My invention relates to a spring connection and is particularly though not exclusively adapted for connecting the ends of elliptical springs.

It is an object of the invention to provide an improved spring connection of simple construction, easy to assemble and adjust, and relatively cheap to manufacture.

It is a more specific object to provide a spring connection having improved means for rigidly holding spring bearing parts in predetermined position.

Other objects will become apparent upon a reading of the descriptive portion of the specification.

In the drawing which shows, for illustrative purposes only, a preferred form of the invention—

Fig. 1 is a view in side elevation of a spring connection, illustrating features of the invention;

Fig. 2 is a sectional view taken substantially in the plane of the line 2—2 of Fig. 1, parts being broken away on a different section at the left to illustrate interior construction.

In the drawing, 5 indicates the end of an upper load carrying vehicle spring or support. 6 represents the end of a lower load carrying spring. 6' is a fitting which may be rigidly secured to the spring end 5 and which is recessed on the lower side to form two spaced parallel bosses 7—8. Each of these bosses is provided with passages 9 which may be threaded to receive threaded cups or raceway members 11 which constitute a part of each of the antifriction bearings, preferably of the ball type. 13 represents the balls within said raceway members. 14 is a pin having raceways or tracks 16 on the ends thereof for the balls in the respective cups. This pin is held snugly in the eye 15 of the spring 6, which eye stands within the space between the bosses. 17 is a tapered recess which may be provided to receive the tapered end of a set screw 18 to hold the pin in place in the spring eye. At the inner end of each cup may be any suitable dust ring 19, which ring also serves to retain lubricant. The rear end of each boss is provided with a horizontal slit 10 so that the lower part of each boss will be slightly flexible. Each boss is provided with a bolt 12 standing in a passage which extends downwardly through the rigid top of the fitting and through the end of the lower flexible part of the same. By this means said bolt may be readily entered from above and secured by a suitable nut underneath the flexible end whereby when the nut is tightened up the lower flexible end will be clamped on its respective bearing cup 9 so as to hold it in the desired position of adjustment. By this construction the upper or load carrying part of the fitting which is secured to the spring 5 is rigid and the only yielding portions are the lower sides of each of the bosses 7—8. By this construction not only is assembly greatly facilitated but the clamping nuts for the bolts 12—12 are hidden from view as well as protected from injury.

The assembly of the device is relatively simple. With the bearing cups 11 removed, the spring eye 15 may be moved up into place substantially as shown in the drawing, and the pin 14 then passed through one of the openings 9, and driven or otherwise forced into the spring eye 15 with a very tight fit. If desired, the set screw 18 or equivalent means may be employed as additional security. The bearing cups 11—11 may then be put in place and positioned so as to provide the desired fit between the antifriction bearing members 13 and their respective raceways, after which the bolts 12 may be employed for decreasing the size of the opening 9 and rigidly clamping the bearing cups 11—11 in place.

By this construction and arrangement the over-all width of the combined parts may be reduced inasmuch as the outer ends of the cups 11—11 may be substantially flush with the outer sides of the bosses 7—8 and this is further advantageous in that it brings the balls 13 closer to the spring eyes making it possible to reduce the length of the pin 14 to the minimum.

As an alternate method of assembly, the pin 14 may be first driven into the spring eye 15 and then moved transversely into place, but for such movement the split portion 10 would have to be of a width sufficient to permit the pin 14 to pass into the position shown in the drawing. Broadly, this method of assembly is disclosed in my prior Patent No. 1,594,476, August 3, 1926.

It will thus be seen that I have provided a simple spring connection which is of relatively few parts, rather sightly in appearance, easy to assemble, and one in which the parts will be rigidly held in place against accidental displacement.

While a preferred embodiment of the invention has been disclosed in considerable detail, I do not wish to be strictly limited to the form shown, since many changes may be made within the scope of the invention as defined in the appended claims.

I claim:

1. In a connection for a load carrying vehicle spring, a fitting comprising a rigid upper portion with two depending substantially parallel spaced bosses at opposite sides thereof, aligned threaded passages through said bosses, the rear side of each boss being slitted in a substantially horizontal plane to form a flexible lower portion, a bolt passage at each side of said fitting extending downwardly from the top of said rigid portion and through the flexible end of said fitting, a bolt therefor, raceway cups adjustably mounted in said openings, said cups being closed at their outer ends, a pin for supporting the eye of a load carrying vehicle spring positioned between said bosses, with antifriction devices between raceway members and the ends of said pin for supporting the latter.

2. A load carrying vehicle spring connector, a fitting comprising a body having two depending substantially parallel spaced bosses at opposite sides thereof, transverse aligned passages extending through said bosses, the rear side of each depending portion being slitted on a substantially horizontal plane to form a flexible strap end at the lower side of each boss, a raceway cup having a closed outer end threadably mounted in one of said transverse openings, another raceway cup having a closed outer end mounted in the other transverse opening, a bearing pin for supporting a spring end, the ends of said pin extending into said cups, antifriction devices between the pin ends and said cups, and a clamping bolt for each boss extending downwardly from the top rigid portion of said fitting through the lower strap end thereof for clamping said strap end securely on the outer wall of said cup.

JOHN W. SMITH.